United States Patent
Xu

(10) Patent No.: US 10,993,213 B2
(45) Date of Patent: Apr. 27, 2021

(54) METHOD AND APPARATUS FOR CONTROLLING SECONDARY CARRIERS IN ASYMMETRIC UPLINK CARRIER AGGREGATION

(71) Applicant: CHENGDU TD TECH LTD., Chengdu (CN)

(72) Inventor: Shaojun Xu, Chengdu (CN)

(73) Assignee: CHENGDU TD TECH LTD., Chengdu (CN)

( * ) Notice: Subject to any disclaimer, the term of this patent is extended or adjusted under 35 U.S.C. 154(b) by 0 days.

(21) Appl. No.: 15/445,943

(22) Filed: Feb. 28, 2017

(65) Prior Publication Data

US 2017/0171848 A1 Jun. 15, 2017

Related U.S. Application Data

(63) Continuation of application No. PCT/CN2015/086320, filed on Aug. 7, 2015.

(30) Foreign Application Priority Data

Aug. 28, 2014 (CN) .......................... 201410433463.7

(51) Int. Cl.
*H04W 72/04* (2009.01)
*H04W 72/12* (2009.01)
(Continued)

(52) U.S. Cl.
CPC ........... *H04W 72/042* (2013.01); *H04L 5/001* (2013.01); *H04L 5/0048* (2013.01);
(Continued)

(58) Field of Classification Search
CPC .......................... H04W 72/042; H04W 76/15
See application file for complete search history.

(56) References Cited

U.S. PATENT DOCUMENTS 9,414,340 B2 * 8/2016 Dinan ............... H04W 74/0833
9,826,515 B2 * 11/2017 Freda ................... H04L 5/0055
(Continued)

FOREIGN PATENT DOCUMENTS

CN       102548007 A     7/2012
CN       103369695 A    10/2013
(Continued)

OTHER PUBLICATIONS

Dahlman, Erik et al., "Downlink Physical-Layer Processing—Chapter 10" 4G: LTE/LTE-Advanced for Mobile Broadband (second edition); Oct. 7, 2013; pp. 161-240; ISBN: 978-0-12-419985-9 (Year: 2013).*

(Continued)

*Primary Examiner* — Andrew Lai
*Assistant Examiner* — Chuong M Nguyen
(74) *Attorney, Agent, or Firm* — J.C. Patents

(57) ABSTRACT

The invention provides a method and an apparatus for controlling secondary carriers in an asymmetric uplink carrier aggregation, the method includes: an eNB transmits configuration information of uplink secondary carriers configured for a UE to the UE, wherein the configuration information includes carrier-specific common configuration information and/or UE-specific configuration information; furthermore, the eNB schedules the uplink secondary carriers via a physical downlink control channel PDCCH of the downlink primary carrier, so that the UE performs a scheduling of a PUSCH to the eNB via the uplink secondary carriers, thus realizing a control of the secondary carriers in the asymmetric uplink carrier aggregation and greatly improving the uplink throughput.

12 Claims, 3 Drawing Sheets

(51) Int. Cl.
*H04L 5/00* (2006.01)
*H04W 76/15* (2018.01)
*H04L 1/18* (2006.01)

(52) U.S. Cl.
CPC ........... *H04L 5/0053* (2013.01); *H04W 72/12* (2013.01); *H04W 72/1268* (2013.01); *H04W 76/15* (2018.02); *H04L 1/1861* (2013.01); *H04L 5/0055* (2013.01)

(56) References Cited

U.S. PATENT DOCUMENTS

| | | | | |
|---|---|---|---|---|
| 2010/0111107 | A1* | 5/2010 | Han | H04L 5/0053 370/472 |
| 2010/0172308 | A1* | 7/2010 | Nam | H04L 5/0055 370/329 |
| 2010/0254292 | A1* | 10/2010 | Kim | H04W 52/346 370/311 |
| 2011/0243066 | A1* | 10/2011 | Nayeb Nazar | H04L 1/1671 370/328 |
| 2012/0009969 | A1* | 1/2012 | Park | H04W 52/241 455/522 |
| 2012/0120909 | A1* | 5/2012 | Ng | H04L 5/0098 370/329 |
| 2012/0230272 | A1* | 9/2012 | Kim | H04W 72/0446 370/329 |
| 2013/0010711 | A1* | 1/2013 | Larsson | H04W 56/0045 370/329 |
| 2013/0083740 | A1* | 4/2013 | Eriksson | H04L 1/1861 370/329 |
| 2013/0094450 | A1* | 4/2013 | Umesh | H04W 52/242 370/329 |
| 2013/0100938 | A1* | 4/2013 | Kwon | H04L 27/2655 370/336 |
| 2013/0242751 | A1* | 9/2013 | Li | H04W 28/18 370/241 |
| 2014/0092786 | A1* | 4/2014 | He | H04W 36/0085 370/280 |
| 2014/0204867 | A1* | 7/2014 | Lim | H04L 5/0094 370/329 |
| 2014/0247794 | A1* | 9/2014 | Aiba | H04L 5/0055 370/329 |
| 2015/0055521 | A1* | 2/2015 | Seo | H04L 5/001 370/280 |
| 2015/0092694 | A1* | 4/2015 | You | H04W 72/0406 370/329 |
| 2016/0007374 | A1* | 1/2016 | Lee | H04W 72/0446 370/336 |

FOREIGN PATENT DOCUMENTS

| | | | |
|---|---|---|---|
| CN | 103430467 A | 12/2013 | |
| WO | WO-2010123286 A2 * | 10/2010 | ........... H04L 1/1861 |
| WO | WO 2012/135998 A1 | 10/2012 | |
| WO | WO-2012135998 A1 * | 10/2012 | ........ H04W 56/0045 |

OTHER PUBLICATIONS

International Search Report of corresponding International PCT Application No. PCT/CN2015/086320, dated Oct. 28, 2015.
Dahlman, Erik et al., "Downlink Physical-Layer Processing—Chapter 10" 4G: LTE/LTE-Advanced for Mobile Broadband (second edition); Oct. 7, 2013; pp. 161-240; ISBN: 978-0-12-419985-9.
Dahlman, Erik et al., "Physical Transmission Resources—Chapter 9" 4G: LTE/LTE-Advanced for Mobile Broadband (second edition); Oct. 7, 2013; pp. 141-159; ISBN: 978-0-12-419985-9.
Qualcomm Incorporated, "System information delivery under carrier aggregation" 3GPP TSG RAN WG2 #69, San Francisco, USA; Doc No. R2-101398; Feb. 22-26, 2010.
Samsung, "PHICH Mapping in Asymmetric Carrier Aggregation" 3GPP TSG RAN WG1 Meeting, Miyazaki, Japan; Doc No. RI-094080; Oct. 12-16, 2009.
The extended European Search Report of corresponding European application No. 15835839.0-1219/3188563, dated Feb. 12, 2018.
D5: 3GPP TS 36.212, V12.1.0 (Jun. 2014).
D6: 3GPP TSG RAN WG1 #59; Jeju, Korea, Nov. 9-13, 2009.
D7: 3GPP TSG-RAN WG2 Meeting #78; San Francisco, USA, Nov. 14-18, 2011.
The fifth Office Action of EP 15 835 839.0.
"Timing and Pathloss reference for SCell to support MTA and inter-band CA", 3GPP TSG-RAN WG2 #76, Nov. 14-18, 2011, San Francisco.

* cited by examiner

METHOD AND APPARATUS FOR CONTROLLING SECONDARY CARRIERS IN ASYMMETRIC UPLINK CARRIER AGGREGATION

CROSS-REFERENCE TO RELATED APPLICATIONS

This application is a continuation of International Application No. PCT/CN2015/086320, filed on Aug. 7, 2015, which claims priority to Chinese Patent Application No. 201410433463.7, filed on Aug. 28, 2014, both of which are hereby incorporated by reference in their entireties.

TECHNICAL FIELD

Embodiments of the present invention relate to the communication technology, and more particularly, to a method and an apparatus for controlling secondary carriers in an asymmetric uplink carrier aggregation.

BACKGROUND

In the current long term evolution (LTE) system, a single-carrier only supports a system bandwidth of maximum to 20 M, and the carrier aggregation technique is required to meet the greater bandwidth requirements.

In the 3rd generation partnership project (3GPP) protocol, aggregation of up to five carriers is supported, and the number of downlink carriers is required to be equal to or greater than the number of uplink carriers.

However, in some industry network applications, there are a large number of video-surveillance-class traffics, that is to say, the number of uplink traffics is required greater than that of the downlink traffics; but, the existing solution of the carrier aggregation cannot meet the requirement of industry networks. In order to better meet a large number of uplink traffic requirements, the asymmetric uplink carrier aggregation technology needs to be introduced, wherein the number of uplink carriers in which is more than that of downlink carriers. However, how to control secondary carriers in the asymmetric uplink carrier aggregation has not been proposed yet in the prior art. Therefore, how to control the secondary carriers in the asymmetric uplink carrier aggregation is the technical problem to be solved in the present invention.

SUMMARY

Embodiment of the present invention provide a method and an apparatus for controlling secondary carriers in an asymmetric uplink carrier aggregation, which realizes a control of the secondary carriers in the asymmetric uplink carrier aggregation and thus substantially improving the uplink throughput.

In a first aspect, embodiments of the present invention provide a method for controlling secondary carriers in an asymmetric uplink carrier aggregation. The carrier aggregation comprises at least one carrier aggregation cluster including one downlink primary carrier and K uplink carriers, wherein the K uplink carriers include one uplink primary carrier and K-1 uplink secondary carriers which are the uplink carriers other than the uplink primary carrier, and K is an integer greater than or equal to 2, the method for controlling the secondary carriers in the asymmetric uplink carrier aggregation includes:

transmitting, by an eNB, to a UE, configuration information of the uplink secondary carriers configured for the UE, wherein the configuration information includes carrier-specific common configuration information and/or UE-specific configuration information;

scheduling, by the eNB, the uplink secondary carriers via a physical downlink control channel (PDCCH) of the downlink primary carrier, so that the UE performs a scheduling of a physical uplink shared channel (PUSCH) to the eNB via the uplink secondary carriers.

Further, if the configuration information is the carrier-specific common configuration information, the eNB transmits the configuration information of the uplink secondary carriers configured for the UE to the UE, includes:

transmitting, by the eNB, to the UE, the configuration information of the uplink secondary carriers, through the broadcasting (system information blocks (SIBs)) in the downlink primary carrier or via the radio resource control (RRC) protocol dedicated signaling;

correspondingly, if the configuration information is the UE-specific configuration information, the eNB transmits the configuration information of the uplink secondary carriers configured for the UE to the UE, includes:

transmitting, by the eNB, to the UE, the configuration information of the uplink secondary carriers via the RRC dedicated signaling.

Further, the eNB schedules the uplink secondary carriers via the physical downlink control channel (PDCCH) of the downlink primary carrier, includes:

scheduling, by the eNB, the uplink secondary carriers by setting the downlink control information (DCI) format 0 of the PDCCH, wherein the DCI format 0 includes the carrier indication information, and the carrier indication information is configured to indicate the uplink secondary carriers which need to be scheduled; or scheduling, by the eNB, the uplink secondary carriers through indicating the DCI format 0 of the PDCCH by the RRC dedicated signaling; wherein the PDCCH is configured to carry DCI.

Further, after the eNB schedules the uplink secondary carriers via the physical downlink control channel (PDCCH) of the downlink primary carrier, the method further includes:

transmitting, by the eNB, to the UE, feedback information of the PUSCH scheduling of the uplink secondary carriers, via the physical hybrid ARQ indicator channel (PHICH) of the downlink primary carrier.

Further, the transmitting, by the eNB, to the UE, the feedback information of the PUSCH scheduling of the uplink secondary carriers, via the physical hybrid ARQ indicator channel (PHICH) of the downlink primary carrier, includes:

carrying, by the eNB, the acknowledgment (ACK)/non-acknowledgment (NACK) information in an extended PHICH space of the downlink primary carrier; or transmitting, by the eNB, to the UE, the ACK/NACK information via an uplink secondary carrier dedicated subspaces, wherein the uplink secondary carrier dedicated subspaces refer to subspaces used for the uplink secondary carriers in a plurality of subspaces formed by dividing the PHICH space of the downlink primary carrier; and the plurality of subspaces include the uplink secondary carrier dedicated subspaces and a primary carrier dedicated subspace; or transmitting, by the eNB, to the UE, the ACK/NACK information via sharing the PHICH space of the downlink primary carrier.

In a second aspect, an embodiment of the present invention provides an eNB, a carrier aggregation includes at least one carrier aggregation cluster including one downlink primary carrier and K uplink carriers, wherein the K uplink carriers include one uplink primary carrier and K-1 uplink secondary carriers which are the uplink carriers other than the uplink primary carrier, and K is integer greater than or equal to 2, the eNB includes:

a configuration module, configured to transmit configuration information of the uplink secondary carriers configured for a UE to the UE, wherein the configuration information includes carrier-specific common configuration information and/or UE-specific configuration information;

a scheduling module, configured to schedule the uplink secondary carriers via a physical downlink control channel (PDCCH) of the downlink primary carrier, so that the UE performs a scheduling of the physical uplink shared channel (PUSCH) to the eNB via the uplink secondary carriers.

Further, if the configuration information is the carrier-specific configuration information, the configuration module is specifically configured to transmit the configuration information of the uplink secondary carriers to the UE through the SIBs in the downlink primary carrier or via the radio resource control (RRC) protocol dedicated signaling;

correspondingly, if the configuration information is the UE-specific configuration information, the configuration module is further specifically configured to transmit the configuration information of the uplink secondary carriers to the UE via the RRC dedicated signaling.

Further, the scheduling module is specifically configured to:

schedule the uplink secondary carriers by setting the downlink control information (DCI) format 0 of the PDCCH, wherein the DCI format 0 includes the carrier indication information, and the carrier indication information is configured to indicate uplink secondary carriers which need to be scheduled; or schedule the uplink secondary carriers through indicating the DCI format 0 channel of the PDCCH via the RRC dedicated signaling; wherein the PDCCH is configured to carry DCI.

Further, the eNB further includes:

a feedback module, configured to transmit feedback information of the PUSCH scheduling of the uplink secondary carriers to the UE via the physical hybrid ARQ indicator channel (PHICH) of the downlink primary carrier.

Further, the feedback module is specifically configured to:

carry the acknowledgment (ACK)/non-acknowledgment (NACK) information in an extended PHICH space of the downlink primary carrier; or transmit the ACK/NACK information via an uplink secondary carrier dedicated subspaces to the UE, wherein the uplink secondary carrier dedicated subspaces refer to subspaces used for the uplink secondary carriers in a plurality of subspaces formed by dividing the PHICH space of the downlink primary carrier; and the plurality of subspaces includes the uplink secondary carrier dedicated subspaces and a primary carrier dedicated subspace; or transmit the ACK/NACK information to the UE via sharing the PHICH space of the downlink primary carrier.

In the present invention, the eNB transmits the configuration information of uplink secondary carriers configured for the UE to the UE, wherein the configuration information includes the carrier-specific common configuration information and/or the UE-specific configuration information; furthermore, the eNB schedules the uplink secondary carriers via the physical downlink control channel (PDCCH) of the downlink primary carrier, so that the UE may perform the scheduling of the PUSCH to the eNB via the uplink secondary carriers, thus realizing a control of the secondary carriers in the asymmetric uplink carrier aggregation and greatly improving the uplink throughput.

BRIEF DESCRIPTION OF THE DRAWINGS

In order to more clearly illustrate the technical solutions in embodiments of the present invention or in the prior art, the accompanying drawings required to be used in the descriptions of the embodiments or the prior art will be briefly described. It will be obvious that the accompanying drawings in the following description are some embodiments of the present invention, and other drawings may be obtained by those skilled in the art without creative effort according to these accompanying drawings.

DESCRIPTION OF EMBODIMENTS

In order to make the objects, technical solutions and advantages of the embodiments of the present invention clearer, the technical solutions of the embodiments of the present invention will be clearly and completely described below with reference to the accompanying drawings in the embodiments of the present invention. Apparently, the embodiments described here are just part rather than all of the embodiments of the present inventions. All of the other embodiments obtained by those skilled in the art based on the embodiments of the present invention without creative effort are within the scope of the present invention.

Figure 1A:
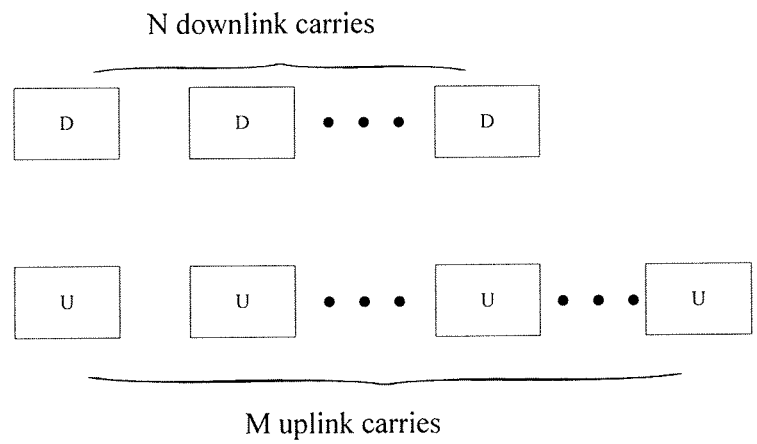
FIG. 1A is a schematic view of an asymmetric uplink carrier aggregation based on an FDD system of the present invention.
Figure 1B:
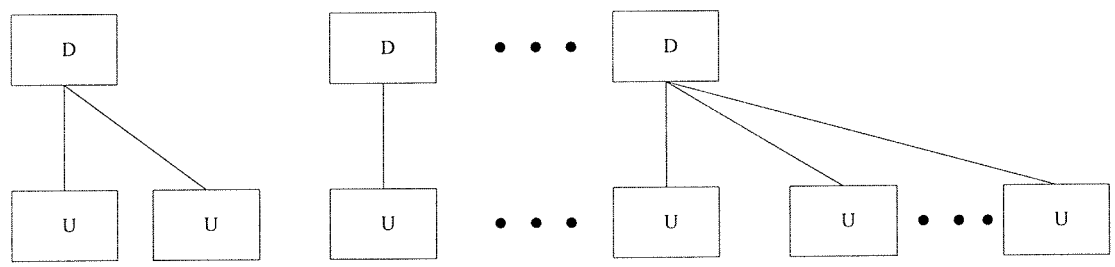
FIG. 1B is an exploded view of the asymmetric uplink carrier aggregation based on the FDD system of the present invention.
Figure 1C:
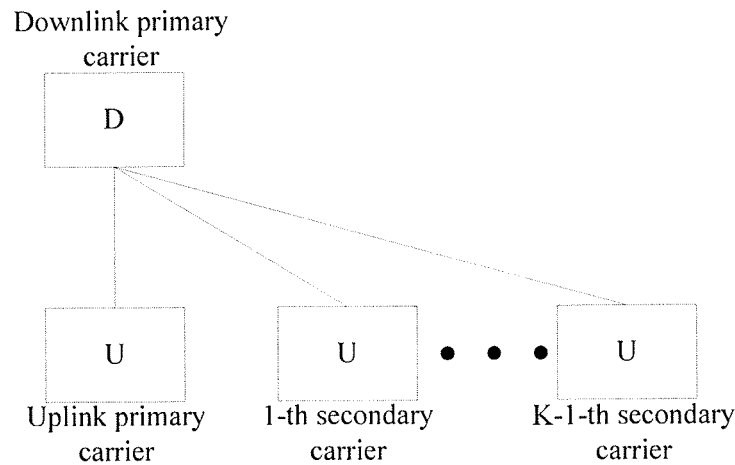
FIG. 1C is a schematic view of carrier aggregation clusters of the asymmetric uplink carrier aggregation based on the FDD system of the present invention.

FIG. 1A is a schematic view of an asymmetric uplink carrier aggregation based on an FDD system of the present invention; FIG. 1B is an exploded view of the asymmetric uplink carrier aggregation based on the FDD system of the present invention; and FIG. 1C is a schematic view of a carrier aggregation cluster of the asymmetric uplink carrier aggregation based on the FDD system of the present invention. In the carrier aggregation based on the frequency division duplexing (FDD) system of the present invention, the number of the uplink carriers is greater than that of the downlink carriers. As shown in FIG. 1A, there are N downlink carriers and M uplink carriers, wherein N and M are both positive integers and N is less than or equal to M. As shown in FIG. 1B, the carrier aggregation includes at least one carrier aggregation cluster, that is, all uplink and downlink carriers can be decomposed into a plurality of carrier aggregation clusters. As shown in FIG. 1C, each carrier aggregation cluster includes a downlink primary carrier and K uplink carriers, wherein the K uplink carriers include one uplink primary carrier and K-1 uplink secondary carriers which are the uplink carriers other than the uplink primary carrier. Wherein K is an integer greater than or equal to 2. Optically, the K aggregated uplink carriers may be at least one of the following carriers: continuous carriers in the same frequency band, discontinuous carrier in the same frequency band, and carriers in the different frequency bands.

Figure 2:
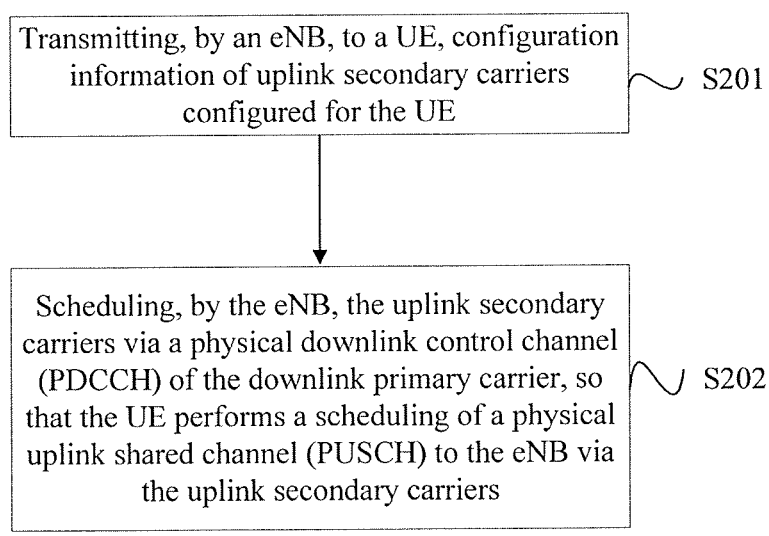
FIG. 2 is a flowchart of a first embodiment of a method for controlling secondary carriers in an asymmetric uplink carrier aggregation according to the present invention.

FIG. 2 is a flowchart of a first embodiment of a method for controlling secondary carriers in an asymmetric uplink carrier aggregation according to the present invention. As shown in FIG. 2, the method of the present embodiment may include:

S201: transmitting, by an eNB, to a UE, configuration information of uplink secondary carriers configured for the UE.

In the embodiment of the present invention, for normally performing the data transmission or reception on the secondary carriers configured by the eNB for the UE, the UE needs to know the configuration information related to the secondary carriers, thus, the eNB transmits the configuration information of uplink secondary carriers configured for the UE to the UE, wherein the configuration information includes a carrier-specific common configuration information and/or a UE-specific configuration information. Optionally, the carrier-specific common configuration information may be at least one of the following information: a physical random access channel (PRACH) configuration, a physical uplink control channel (PUCCH) configuration, and sounding reference signal (SRS) information; and the UE-specific configuration information may be at least one of following information: a channel quality indicator (CQI), a precoding matrix indicator (PMI), a rank indicator (RI) and acknowledgment (ACK) feedback information.

Specifically, if the configuration information is the carrier-specific common configuration information, the step S201 includes:

transmitting, by the eNB, to the UE, the configuration information of the uplink secondary carriers through SIBs in the downlink primary carrier or via a radio resource control (RRC) protocol dedicated signaling.

In the embodiment of the present invention, if the configuration information is the carrier-specific common configuration information, the eNB may transmit the carrier-specific common configuration information related to the uplink secondary carriers to the UE through the SIBs in the downlink primary carrier, so that the UE can perform normal data transmission in the uplink secondary carriers; optionally, the eNB may transmit the related carrier-specific configuration information related to the uplink secondary carriers to the UE via the radio resource control (RRC) protocol dedicated signaling when configuring the uplink secondary carriers for the UE.

Specifically, if the configuration information is the UE-specific configuration information, the step S201 includes:

transmitting, by the eNB, to the UE, the configuration information of the uplink secondary carriers via the RRC dedicated signaling.

In the embodiment of the present invention, if the configuration information is UE-specific configuration information, the eNB may transmit the UE-specific configuration information related to the uplink secondary carriers to the UE via the RRC dedicated signaling, so that the UE can perform normal data transmission in the uplink secondary carriers; optionally, the RRC dedicated signaling may be an RRC ConnectionReconfiguration (RRC connection reconfiguration) message or the like.

Optionally, a cell which supports the uplink carrier aggregation may support access of different types of UEs, wherein the types of the UEs may include, but are not limited to: type 1, UEs which cannot support the scheduling of the secondary carriers; type 2, UEs which can support the scheduling of the secondary carriers, but cannot simultaneously schedule the uplink primary carrier and the secondary carriers at the same time; type 3, UEs which can support the scheduling of the secondary carriers, and can simultaneously schedule the uplink primary carrier and the secondary carriers at the same time.

S202: scheduling, by the eNB, the uplink secondary carriers via a physical downlink control channel (PDCCH) of the downlink primary carrier, so that the UE performs a scheduling of a physical uplink shared channel (PUSCH) to the eNB via the uplink secondary carriers.

In the embodiment of the present invention, since there is only primary carrier in the downlink, the eNB schedules the uplink secondary carriers via the physical downlink control channel (PDCCH) of the downlink primary carrier, so that the UE performs a scheduling of a physical uplink shared channel (PUSCH) to the eNB via the uplink secondary carriers configured for the UE. Optionally, all the uplink secondary carriers are required to be scheduled via the PDCCH of the downlink primary carrier.

Specifically, the step S202 includes: scheduling, by the eNB, the uplink secondary carriers by setting a downlink control information (DCI) format 0 of the PDCCH, wherein the DCI format 0 includes the carrier indication information, and the carrier indication information is configured to indicate the uplink secondary carriers which need to be scheduled; or scheduling, by the eNB, the uplink secondary carriers through indicating a DCI format 0 channel of the PDCCH by the RRC dedicated signaling; wherein the PDCCH is configured to carry DCI.

In the embodiment of the present invention, the PDCCH is configured to carry the DCI, and the DCI includes a plurality of formats, wherein DCI format 0 is configured to schedule the uplink resources, DCI format 1X (1, 1A, 1B, 1C, 1D, etc.) is configured to schedule the downlink resources, DCI format 2X (2, 2A, 2B, etc.) is configured to schedule downlink resources using MIMO, and DCI format 3X (3, 3A) is configured to carry the power control command information. Optionally, the eNB may schedule the uplink secondary carriers by extending a search space of the PDCCH, in particular, by setting the DCI format 0 of the PDCCH, wherein the DCI format 0 includes the carrier indication information, and the carrier indication information is configured to indicate the uplink secondary carriers which need to be scheduled, optionally, the carrier indication information may be an ID of an uplink secondary carrier which needs to be scheduled. Optionally, the eNB may also schedule the uplink secondary carriers by reusing the search space of the primary carrier, in particular, the eNB instructs the PDCCH DCI format 0 channel to schedule the uplink secondary carriers via the RRC dedicated signaling, that is, indicates a carrier scheduled by the current DCI format 0 of the PDCCH via the RRC dedicated signaling. Optionally, when the bandwidth of the secondary carrier is greater than that of the primary carrier, there may be a problem that resource block (RB) allocation bits of the DCI format 0 cannot schedule the entire bandwidth of the secondary carriers. The problem can be solved as follows: i) increasing the resource allocation granularity of the DCI format 0, such as modifying the original RB granularity into 2RB granularity or 3RB granularity; ii) limiting the region of RB that can be scheduled by the UE. In this case, a single user cannot occupy the entire bandwidth of the secondary carriers, while the multiple users can occupy the entire bandwidth.

In the embodiment of the present invention, the eNB transmits the configuration information of uplink secondary carriers configured for the UE to the UE, wherein the configuration information includes the carrier-specific common configuration information and/or the UE-specific configuration information; furthermore, the eNB schedules the uplink secondary carriers via a physical downlink control channel (PDCCH) of the downlink primary carrier, so that the UE may perform the scheduling of the PUSCH to the eNB via the uplink secondary carriers, thus realizing a control of the secondary carriers in the asymmetric uplink carrier aggregation and greatly improving the uplink throughput.

Further, after step S202, the method further includes:

transmitting, by the eNB, to the UE, the feedback information of the PUSCH scheduling of the uplink secondary carriers via a physical hybrid ARQ indicator channel (PHICH) of the downlink primary carrier.

In the embodiment of the present invention, since there is only the primary carrier in the downlink, the feedback information of the eNB needs to be carried in the downlink primary carrier for the PUSCH scheduling of the secondary carriers, and in particular, the eNB transmits the feedback information of the PUSCH scheduling of the uplink secondary carriers to the UE via the physical hybrid ARQ indicator channel (PHICH) of the downlink primary carrier, wherein the feedback information may be ACK (acknowledgment)/NACK (non-acknowledgment) information.

Specifically, the eNB carries the ACK/NACK information in an extended PHICH space of the downlink primary carrier; or the eNB transmits the ACK/NACK information via uplink secondary carrier dedicated subspaces to the UE, wherein the uplink secondary carrier dedicated subspaces refer to subspaces used for the uplink secondary carriers in a plurality of subspaces formed by dividing the PHICH space of the downlink primary carrier; and the plurality of subspaces include the uplink secondary carrier dedicated subspaces and the primary carrier dedicated subspace; or the eNB transmits the ACK/NACK information to the UE by sharing the PHICH space of the downlink primary carrier.

In the embodiment of the present invention, the eNB transmits the feedback information to the UE by extending the PHICH space of the downlink primary carrier, in particular, the eNB carries the ACK/NACK information scheduled by the PUSCH of the uplink secondary carrier in the extended PHICH space of the downlink primary carrier. Optionally, the eNB divides the PHICH space of the downlink primary carrier into a plurality of subspaces including the uplink secondary carrier dedicated subspaces and the primary carrier dedicated subspace, that is, a plurality of subspaces are used for the primary carrier and the secondary carriers respectively. Correspondingly, the eNB may transmit the ACK/NACK information to the UE via the uplink secondary carrier dedicated subspaces, wherein the uplink secondary carrier dedicated subspaces refer to subspaces used for the uplink secondary carriers in a plurality of subspaces formed by dividing the PHICH space of the downlink primary carrier. Optionally, the eNB may also transmit the feedback information to the UE via the PHICH sharing space of the downlink primary carrier, in particular, the eNB transmits the ACK/NACK information to the UE by sharing the PHICH space of the downlink primary carrier, that is, the primary carrier and the uplink secondary carriers share the PHICH space of the downlink primary carrier. When there is a collision, the cyclic shift of the demodulation reference signal (DMRS) may be adjusted to avoid the collision.

In the practice of the present invention, the eNB transmits the configuration information of uplink secondary carriers configured for the UE to the UE, wherein the configuration information includes the carrier-specific common configuration information and/or the UE-specific configuration information; furthermore, the eNB schedules the uplink secondary carriers via a physical downlink control channel (PDCCH) of the downlink primary carrier, so that the UE may perform the scheduling of the PUSCH to the eNB via the uplink secondary carriers; further, the eNB transmits the feedback information of the PUSCH scheduling of the uplink secondary carriers to the UE via the physical hybrid ARQ indicator channel (PHICH) of the downlink primary carrier, thus realizing a control of the secondary carriers in the asymmetric uplink carrier aggregation and greatly improving the uplink throughput.

Further, the uplink power control of the primary carrier may adopt the present mechanism defined by 3GPP, and the uplink closed-loop power control of the secondary carriers may also adopt the present mechanism, but the power control command word of the uplink PUSCH is carried in the downlink PDCCH grants of the primary carrier.

Optionally, for the path loss in the secondary carrier power control, the path loss of the downlink primary carrier may be referred to, and on the basis of the path loss of the downlink primary carrier, the difference between the path loss of the secondary carrier power control and that of the downlink primary carrier is additionally considered.

Optionally, the uplink synchronization of the primary carrier may adopt the present mechanism defined by 3GPP, and the uplink synchronization of the secondary carriers is divided into an open-loop synchronous control and a closed-loop power control. For the closed-loop synchronous control, the same mechanism can be adopted as that adopted by the primary carrier, but the timing advance (TA) command word of the secondary carriers is carried in the downlink primary carrier; and for the open-loop synchronization control, the TA adjustment amount is transmitted to the UE in the downlink random response channel of the primary carrier.

Figure 3:
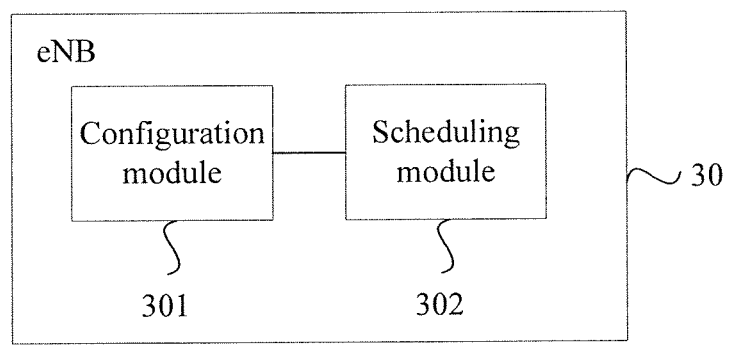
FIG. 3 is a structural view of a first embodiment of an eNB according to the present invention.

FIG. 3 is a structural view of a first embodiment of an eNB according to the present invention. As shown in FIG. 3, an eNB 30 provided in the present embodiment includes a configuration module 301 and a scheduling module 302.

wherein the carrier aggregation includes at least one carrier aggregation cluster, and the carrier aggregation cluster including one downlink primary carrier and K uplink carriers, wherein the K uplink carriers include one uplink primary carrier and K-1 uplink secondary carriers which are the uplink carriers other than the uplink primary carrier. Wherein K is integer greater than or equal to 2;

wherein, the configuration module 301 is configured to transmit configuration information of the uplink secondary carriers configured for a UE to the UE, wherein the configuration information includes carrier-specific common configuration information and UE-specific configuration information;

the scheduling module 302 is configured to schedule the uplink secondary carriers via a physical downlink control channel (PDCCH) of the downlink primary carrier, so that the UE may perform a scheduling of a physical uplink shared channel (PUSCH) to the eNB via the uplink secondary carriers.

Optionally, if the configuration information is the carrier-specific configuration information, the configuration module is specifically configured to transmit the configuration information of the uplink secondary carriers to the UE through SIBs in the downlink primary carrier or via a radio resource control (RRC) protocol dedicated signaling;

correspondingly, if the configuration information is the UE-specific configuration information, the configuration module is further specifically configured to transmit the configuration information of the uplink secondary carriers to the UE via the RRC dedicated signaling.

Optionally, the scheduling module is specifically configured to:

schedule the uplink secondary carriers by setting a downlink control information (DCI) format 0 of the PDCCH, wherein the DCI format 0 includes the carrier indication information, and the carrier indication information is configured to indicate the uplink secondary carriers which need to be scheduled; or schedule the uplink secondary carriers through indicating a DCI format 0 channel of the PDCCH by the RRC dedicated signaling; wherein the PDCCH is configured to carry DCI.

The eNB of the present embodiment can be applied to the technical solution of the first embodiment of the method for controlling the secondary carriers in the asymmetric uplink carrier aggregation in the present invention, and its implementation principle and technical effect are similar, thus the description will not be repeated here.

Optionally, the eNB further includes:

a feedback module, configured to transmit feedback information of the PUSCH scheduling of the uplink secondary carriers to the UE via a physical hybrid ARQ indicator channel (PHICH) of the downlink primary carrier.

Optionally, the feedback module is specifically configured to:

carry acknowledgment (ACK)/non-acknowledgment (NACK) information in an extended PHICH space of the downlink primary carrier; or transmit the ACK/NACK information via uplink secondary carrier dedicated subspaces to the UE, wherein the uplink secondary carrier dedicated subspaces refer to subspaces used for the uplink secondary carriers in a plurality of subspaces formed by dividing the PHICH space of the downlink primary carrier; and the plurality of subspaces include the uplink secondary carrier dedicated subspaces and the primary carrier dedicated subspace; or transmit the ACK/NACK information to the UE by sharing the PHICH space of the downlink primary carrier.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A method for controlling secondary carriers in an asymmetric uplink carrier aggregation, characterized by that a carrier aggregation comprises at least one carrier aggregation cluster comprising one downlink primary carrier and K uplink carriers, wherein the K uplink carriers comprise one uplink primary carrier and K-1 uplink secondary carriers which are uplink carriers other than the uplink primary carrier, and K is an integer greater than or equal to 2, the method for controlling secondary carriers in the asymmetric uplink carrier aggregation comprises:

transmitting, by an eNB, to a user equipment (UE), configuration information of the uplink secondary carriers configured for the UE, wherein the configuration information comprises carrier common configuration information or UE-specific configuration information;

scheduling, by the eNB, the uplink secondary carriers via a physical downlink control channel (PDCCH) of the downlink primary carrier, so that the UE performs a scheduling of a physical uplink shared channel (PUSCH) to the eNB via the uplink secondary carriers; and transmitting, by the eNB, to the UE, feedback information of the PUSCH scheduling of the uplink secondary carriers, via a physical hybrid automatic repeat request (ARQ) indicator channel (PHICH) of the downlink primary carrier, wherein the scheduling, by the eNB, the uplink secondary carriers via the PDCCH of the downlink primary carrier, comprises:

scheduling, by the eNB, the uplink secondary carriers by setting a downlink control information (DCI) format 0 of the PDCCH, wherein the DCI format 0 comprises the carrier indication information, and the carrier indication information is configured to indicate uplink secondary carriers which need to be scheduled; or scheduling, by the eNB, the uplink secondary carriers through indicating a DCI format 0 channel of the PDCCH via the RRC dedicated signaling; wherein the PDCCH is configured to carry DCI;

wherein when a bandwidth of the uplink secondary carriers is greater than a bandwidth of the downlink primary carrier, the scheduling, by the eNB, the uplink secondary carriers via the PDCCH of the downlink primary carrier further comprises:

increasing a resource allocation granularity of the DCI format 0.

2. The method according to claim 1, wherein if the configuration information is the carrier common configuration information, the transmitting, by the eNB, to the UE, the configuration information of the uplink secondary carriers configured for the UE, comprises:

transmitting, by the eNB, to the UE, the configuration information of the uplink secondary carriers, through broadcasting in the downlink primary carrier or via a radio resource control (RRC) protocol dedicated signaling;

correspondingly, if the configuration information is the UE-specific configuration information, the transmitting, by the eNB, to the UE, the configuration information of the uplink secondary carriers configured for the UE, comprises:

transmitting, by the eNB, to the UE, the configuration information of the uplink secondary carriers via the RRC dedicated signaling.

3. The method according to claim 1, wherein the ACK/NACK information is transmitted via the secondary carrier dedicated subspaces for confirming the PUSCH scheduling of the uplink secondary carriers.

4. The method according to claim 1, wherein the transmitting, by the eNB, to the UE, the feedback information of the PUSCH scheduling of the uplink secondary carriers via the PHICH of the downlink primary carrier, comprises:
carrying, by the eNB, an acknowledgment (ACK)/non-acknowledgment (NACK) information in an extended PHICH space of the downlink primary carrier; or
transmitting, by the eNB, to the UE, the ACK/NACK information via uplink secondary carrier dedicated subspaces, wherein the uplink secondary carrier dedicated subspaces refer to subspaces used for the uplink secondary carriers in a plurality of subspaces formed by dividing the PHICH space of the downlink primary carrier; and the plurality of subspaces comprise the uplink secondary carrier dedicated subspaces and a primary carrier dedicated subspace; or
transmitting, by the eNB, to the UE, the ACK/NACK information by sharing the PHICH space of the downlink primary carrier.

5. The method according to claim 1, wherein a path loss of the uplink secondary carriers is determined according to a path loss of the downlink primary carrier and a difference between the path loss of the uplink secondary carriers and the path loss of the downlink primary carrier, wherein the uplink carriers are carriers in different frequency bands.

6. The method according to claim 1, wherein a path loss of the uplink secondary carriers is determined according to a path loss of the downlink primary carrier and a difference between the path loss of the uplink secondary carriers and the path loss of the downlink primary carrier, wherein the uplink primary carrier is in a different frequency band from that of at least one uplink secondary carrier.

7. An eNB, characterized by that a carrier aggregation comprises at least one carrier aggregation cluster comprising one downlink primary carrier and K uplink carriers, wherein the K uplink carriers comprise one uplink primary carrier and K-1 uplink secondary carriers which are uplink carriers other than the uplink primary carrier and K is an integer greater than or equal to 2, the eNB comprises:
a processor; and
a computer-readable medium for storing program codes, which, when executed by the processor, cause the processor to:
transmit configuration information of the uplink secondary carriers configured for a user equipment (UE) to the UE, wherein the configuration information includes carrier common configuration informationor UE-specific configuration information;
schedule the uplink secondary carriers via a physical downlink control channel (PDCCH) of the downlink primary carrier, so that the UE performs a scheduling of a physical uplink shared channel (PUSCH) to the eNB via the uplink secondary carriers; and
transmit feedback information of the PUSCH scheduling of the uplink secondary carriers to the UE via a physical hybrid ARQ indicator channel (PHICH) of the downlink primary carrier, wherein the program codes further cause the processor to:
schedule the uplink secondary carriers by setting a downlink control information (DCI) format 0 of the PDCCH, wherein the DCI format 0 comprises the carrier indication information, and the carrier indication information is configured to indicate uplink secondary carriers which need to be scheduled; or
schedule the uplink secondary carriers through indicating the DCI format 0 channel of the PDCCH via the RRC dedicated signaling; wherein the PDCCH is configured to carry DCI;
wherein when a bandwidth of the uplink secondary carriers is greater than a bandwidth of the downlink primary carrier, the program codes further cause the processor to:
increase a resource allocation granularity of the DCI format 0.

8. The eNB according to claim 7, wherein if the configuration information is the carrier common configuration information, the program codes further cause the processor to transmit the configuration information of the uplink secondary carriers to the UE through broadcasting in the downlink primary carrier or via a radio resource control (RRC) protocol dedicated signaling;
correspondingly, if the configuration information is the UE-specific configuration information, the program codes further cause the processor to transmit the configuration information of the uplink secondary carriers to the UE via the RRC dedicated signaling.

9. The eNB according to claim 7, wherein the ACK/NACK information is transmitted via the secondary carrier dedicated subspaces for confirming the PUSCH scheduling of the uplink secondary carriers.

10. The eNB according to claim 7, wherein the program codes further cause the processor to:
carry an acknowledgment (ACK)/non-acknowledgment (NACK) information in an extended PHICH space of the downlink primary carrier; or
transmit to the UE, the ACK/NACK information via uplink secondary carrier dedicated subspaces, wherein the uplink secondary carrier dedicated subspaces refer to subspaces used for the uplink secondary carriers in a plurality of subspaces formed by dividing the PHICH space of the downlink primary carrier; and the plurality of subspaces comprise the uplink secondary carrier dedicated subspaces and a primary carrier dedicated subspace; or
transmit to the UE, the ACK/NACK information by sharing the PHICH space of the downlink primary carrier.

11. The eNB according to claim 7, wherein a path loss of the uplink secondary carriers is determined according to a path loss of the downlink primary carrier and a difference between the path loss of the uplink secondary carriers and the path loss of the downlink primary carrier, wherein the uplink carriers are carriers in different frequency bands.

12. The eNB according to claim 7, wherein a path loss of the uplink secondary carriers is determined according to a path loss of the downlink primary carrier and a difference between the path loss of the uplink secondary carriers and the path loss of the downlink primary carrier, wherein the uplink primary carrier is in a different frequency band from that of at least one uplink secondary carrier.

* * * * *